3,322,721
ESSENTIALLY SATURATED PREFORMED POLYMERS MODIFIED WITH POLYFLUOROKETONES
Edward George Howard, Jr., Hockessin, Del., assignor to E. I. du Pont de Nemours and Company, Wilmington, Del., a corporation of Delaware
No Drawing. Filed Apr. 13, 1964, Ser. No. 359,436
24 Claims. (Cl. 260—46.5)

This application is a continuation-in-part of my copending application Ser. No. 277,692, filed May 3, 1963, and now abandoned.

This invention relates to, and has as its principal objects provision of, a method for the treatment of certain preformed polymers and manufacturers made therefrom and novel polymers and manufacturers produced by the treatment.

The new polymers of this invention are polymers formed from recurring monomeric units, i.e., units derived from a precursor monomer, carrying pendant to aliphatic carbon the groups,

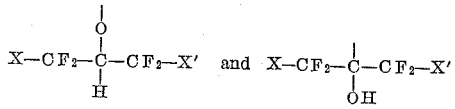

wherein X and X' may be the same or different and are selected from the group consisting, individually, of hydrogen, halogen of atomic number 9 to 35, perfluoroalkyl, ω-hydro-, ω-chloro-, ω-bromo- and ω-alkoxyperfluoroalkyl, all of such groups being of up to 18 carbons, and, jointly, of haloperfluoroalkylene of 1 to 3 carbons (all halogen being of atomic number 9 to 35), said polymers containing sufficient pendant groups to contribute at least 0.5% by weight of fluorine.

These new polymers are readily obtained by the treatment which comprises reacting a preformed polymer having (1) recurring monomeric units with carbon-hydrogen bonds and (2) a molecular weight of at least 1,000 and (3) in which any aliphatic carbon-carbon unsaturation is ethylenic and present in not more than 10% by weight of the recurring monomeric units making up the polymer structure with a polyfluoroketone of the formula

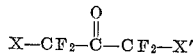

where X and X' are as defined above, in the presence of a catalytic amount of a substance capable of yielding free radicals under the reaction conditions. In view of the manner in which the present polymers are made, it is sometimes convenient to refer to the preformed polymer as the "basic polymer" and to the product obtained on reaction with the fluoroketone as the "modified polymer."

In a preferred method for preparing the present modified polymers, a reactor is charged with a preformed polymer of the above mentioned type, a polyfluoroketone in amount which is at least 5% by weight of the polymer, a peroxy compound, usually a peroxide, in amount which is at least 0.1% by weight of the polyfluoroketone, and, optionally, an inert reaction medium. The charged reactor is then maintained between −80° C. and 250° C. for up to 24 hours. If the reaction has been conducted below room temperature, the charge is then brought to room temperature, or if temperatures above ambient were used, the charge is allowed to cool to room temperature. Thereafter, the reactor is discharged and the modified polymer is isolated by filtration or, if soluble, by precipitation, by distilling off volatile products, or by other methods known to those skilled in the art.

Alternatively, manufactures made from preformed polymers of the class described can be modified by treatment with a polyfluoroketone and exhibit on their surfaces the general improvements resulting from the interaction between the polymer and the ketone, e.g., improved dye receptivity, etc. Such modification is accomplished by contacting the manufacture with the polyfluoroketone under free-radical-generating conditions provided for example, by a peroxy compound, an electron beam or actinic light (see Examples VI, VII, XVII and XXXI). Bulky objects can be given a surface treatment in this manner. This alternative procedure and the manufactures treated thereby form a specific aspect of the invention.

Polymers that can be modified according to the practice of this invention comprise all preformed polymers which contain aliphatic carbon-hydrogen bonds, have a molecular weight of at least 1,000 and in which any aliphatic carbon-carbon unsaturation is ethylenic and present in no more than 10 percent by weight of the recurring monomeric units. These polymers include the products obtained by polymerizing a monoolefinic compound alone or in admixture with one or more of another olefinic compound. Examples of polymerizable monoolefinic compounds are ethylene, propylene, isobutylene, vinyl chloride, vinylidene chloride, vinyl fluoride, vinylidene fluoride, vinyl acetate, vinyl propionate, vinyl stearate, acrylic and methacrylic acids, acrylic and methacrylic esters, e.g., methyl, ethyl, propyl and butyl acrylates and methacrylates, acrylamide and methacrylamide, N-alkyl and N,N-dialkyl acrylamides and methacrylamides, e.g., N-methyl and N,N-dimethyl acrylamide and methacrylamide, acrylonitrile, vinylidene cyanide, styrene, o-methyl styrene, and methylenecyclohexane. Also usable as comonomers are dienes such as butadiene-1,3, 2 - methylbutadiene - 1,3, 2,3-dimethylbutadiene-1,3, 6-methylheptadiene-1,5, hexadiene-1,5, hexadiene-1,4, 7-ethylnonadiene-1,7, 2-methylhexadiene-1,4, dicyclopentadiene, 5 - methylene - bicyclo[2.2.1]hept-2-ene, chloro-2-butadiene-1,3- fluoro-2-butadiene-1,3, etc. Polymers capable of treatment by the process of this invention also include polyamides such as polyhexamethylene succinamides, adipamides, sebacamides, etc., polyesters such as polyethylene glycol terephthalate, succinate, etc., fatty acid-modified glycol and glycerol phthalates, polyoxymethylenes, polylactides, polylactones, polyethers, and the like.

It may be noted that polymers developed from a diene as a comonomer should contain the diene moiety in amount such that no more than 10% by weight of the recurring monomeric units contain aliphatic carbon-carbon, i.e., ethylenic, unsaturation.

A preferred class of polymers which can be modified according to the present invention are the elastomeric terpolymers obtained from ethylene, one other α-olefin hydrocarbon, and a diene hydrocarbon in which the olefinic unsaturation is nonconjugated. These elastomeric polymers are disclosed and claimed in U.S. 2,933,480. Examples of such elastomeric polymers are the products obtained by polymerizing ethylene with propylene and 1,4-hexadiene in the presence of a coordination catalyst. These coordination catalysts are made from components of two types, first, compounds of the transition heavy metals of Groups IV, V, and VI, beginning with titanium, vanadium, and chromium, respectively, and, second, organometallic compounds, hydrides, and free metals of Groups I, II and III, beginning with lithium, magnesium, and aluminum, respectively. The compounds of the first type are preferably halides, oxyhalides and alcoholates, the preferred metals being titanium and vanadium. The metals of the component of the second type are preferably aluminum, magnesium, sodium and lithium, and the organic portions are preferably alkyl radicals. In these organometallic compounds the valences of the metal may be partly satisfied by halogen or alkoxy, provided that at least one bond connects the metal with an organic radical. Mixtures of two or more catalysts of the above-described types may be used, if desired.

Examples of polyfluoroketones useful in modifying preformed polymers according to the invention are perfluoroacetone, 1H,3H-tetrafluoropropanone, 1-chloropentafluoropropanone, perfluoropentane-2-one, 9-bromoperfluorononane-4-one, perfluorododecane-5-one, 1H,7H-dodecafluoroheptane-3-one, 1,5-dichloroperfluoropentane-3-one, 1,9-dibromoperfluorononane-5-one, 1,17-dichloroperfluoroheptadecane-9-one, perfluorocyclobutanone, 2-chloro-2,3,3,4,4-pentafluorocyclobutanone, 2-bromo-2,3,3,4,4-pentafluorocyclobutanone, 4-methoxyperfluorobutane-2-one, 5-octyloxyperfluoropentane-3-one, 1-methoxyperfluoropentadecane-8-one, and the like, and the hydrated forms thereof. These polyfluoroketones are known compounds preparable by general methods as shown, for example, by Lovelace et al., "Aliphatic Fluorine Compounds," Reinhold Publishing Co., pages 182–187 (1958), and also in U.S. Patents 3,029,252, 3,039,995 and 3,091,643.

Examples of peroxy compounds useful in the process aspect of the invention are dibenzoyl peroxide, dilauroyl peroxide, dimethyl peroxide, diethyl peroxide, di-t-butyl peroxide, dioctadecyl peroxide, t-butyl peroxy pivalate, disuccinoyl peroxide, diacetyl peroxide, hydrogen peroxide, tetralin peroxide, urea peroxide, peracetic and perbenzoic acids, alkyl dialkylboron peroxides, alkali metal persulfates, perborates, and percarbonates, all alone or in combination with a reducing agent, etc. The amount of peroxy compound employed depends upon the particular reactants being used, the temperature chosen for the reaction, etc. As a rule, the amount is at least 0.01% by weight of the polyfluoroketone. Most generally, 0.5% by weight of the polyfluoroketone is adequate to promote the reaction at a satisfactory rate. The upper limit of catalyst is not critical. Use of more than 10% by weight of the polyfluoroketone, however, has no advantage and this represents a practical upper limit.

The reaction between the polymer and polyfluoroketone can also be initiated using other sources of free radicals such as actinic light, combinations of actinic light with diketones, high-energy electrons, benzoin plus actinic light, etc.

Although not essential, a reaction medium is usually employed in order to bring about better contact between the reactants. Suitable reaction media are benzene, fluorocarbons, e.g., perfluorocyclobutane, dichlorotetrafluoroethane, dichlorodifluoromethane, perfluoro-2-butyl tetrahydrofuran, bis(perfluoromethyl)benzyl alcohol, hexafluoroisopropanol, carbon bisulfide, diphenyl, cyclohexane, water, etc. The choice of reaction medium will depend upon the particular perfluoroketone, the preformed polymer being reacted, and the type of product desired.

The polyfluoroketone is employed in an amount which is at least 5% by weight of the preformed polymer. However, it may also be used in larger amounts to function both as a reactant and as a reaction medium.

The reaction temperatures and pressure can vary over wide limits. Thus, the temperature can be as low as −80° C. with very active free-radical generating initiators, or as high as 250° C. with initiators requiring high temperatures for activation. As a rule, good reaction rates are obtained at temperatures in the range of 40° to 150° C., and the process is generally carried out within this temperature range. The pressure employed depends upon the nature of the preformed polymer, the temperature, and the initiator used.

The reaction is carried on for from one minute up to 24 hours or more. Generally, however, reaction periods of 5 minutes to 15 hours are used.

The material out of which the reactor is built is important only to the extent that it should be one which is resistant to corrosion and should not promote undesired side reactions.

In the formation of the modified polymers of this invention the polyfluoroketone attaches itself to the carbon chain at a place formerly occupied by hydrogen at an aliphatic carbon-hydrogen bond and the hydrogen which is displaced attaches itself either to the carbon of the oxocarbonyl group or to the oxygen of the oxocarbonyl group. The mode of attachment is illustrated by the reaction of a monomeric hydrocarbon, i.e., cyclohexane, with a polyfluoroketone, i.e., hexafluoroacetone, as shown in the following experiment:

A mixture of 84 g. (1 mole) of cyclohexane, 1 g. of di-t-butyl peroxide, and 34 g. (0.2 mole) of hexafluoroacetone was heated at 135° C. for 12 hours and then distilled. There was collected 28.5 g. of a fraction boiling at 61–68° C. 23 mm. and 13 g. of a clear residue. The fraction boiling at 61° to 68° C. was shown by n-m-r analysis to be a 1:1 hexafluoroacetone/cyclohexane reaction product consisting of a mixture of one part of $$C_6H_{11}OCH(CF_3)_2$$

and six parts of $C_6H_{11}C(CF_3)_2OH$. These were separated by extraction with a 5% aqueous base which dissolved the alcohol. Acidification of the extract gave the alcohol.

Calcd. for $C_9H_{12}F_6O$: C, 43.21%; H, 4.84%; F, 45.56%

B.P. 55–57° C./22 mm.; $n_D^{25}=1.3684$; C, 44.81%; H, 5.20%; F, 44.30%

$C_6H_{11}C(CF_3)_2OH$, B.P. 65.5° C./22 mm.; $n_D^{25}=1.3861$; C, 44.23%; H, 5.06%; F, 45.70%

The reaction leading to the formation of the above 1:1 cyclohexane/hexafluoroacetone reaction products may be schematically illustrated by the following equation:

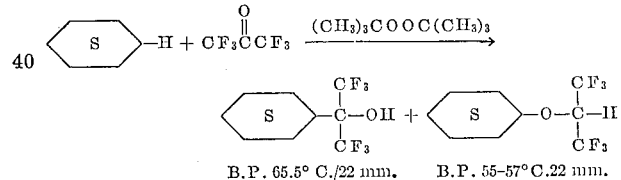

B.P. 65.5° C./22 mm.    B.P. 55–57° C./22 mm.

The equation above may be generalized as follows:

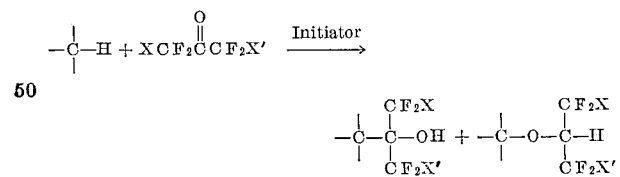

X and X′ having their previously assigned meanings.

The modified polymers of this invention have properties markedly improved over those of the unmodified base polymers. Thus, they have better dye receptivity, excellent adhesion to metal surfaces, increased flame resistance, and greater flexibility and softness. The modified polymers find application as protective coatings for rigid and nonrigid substrates and in other uses in which polymers are known to be useful. Since the modified polymers have reduced coefficients of friction, they are also useful in windshield wipers and other articles where low coefficients of friction are desirable (see Example XXV).

The samples which follow illustrate but do not limit this invention. In these examples, percentages are by weight unless otherwise indicated.

EXAMPLE I

A mixture of 100 ml. of benzene, 0.1 g. of di-t-butyl peroxide, 5 g. of linear polyethylene (Du Pont, Alathon® 7020), and 15 g. of hexafluoroacetone was heated at 135° C. with agitation for eight hours in a closed reactor.

When the reactor was cooled and opened, 7 g. of solid, white polymer was obtained. A film pressed at 150° C. from the modified polymer was pliable, transparent, colorless and strong, in contrast to the hazy, stiff film obtained from the unmodified polyethylene. The film from the modified polymer is useful as a wrapping foil.

The modified polymer was purified by dissolving it in hot toluene, filtering the hot solution, and cooling to reprecipitate the polymer. When dried at 145° C./0.1 mm., a film prepared therefrom was rubbery. The modified polymer analyzed 24.70% F, which corresponds to 36% combined hexafluoroacetone.

The above experiment was repeated, except that the peroxide catalyst was omitted. Under these conditions no reaction between the polymer and hexafluoroacetone was observed.

EXAMPLE II

Under the conditions described in Example I, 20 g. of the linear polyethylene of Example I was reacted under autogenous pressure with 35 g. of hexafluoroacetone in the presence of 200 ml. of benzene and 0.2 g. of di-t-butyl peroxide. The resulting modified polymer was white when dry and weighed 33 g. The modified polymer was purified by reprecipitation from hot benzene and drying at 100° C. under vacuum. Analysis showed the polymer to contain 30.67% F, which corresponds to 44.7% combined hexafluoroacetone. Infrared analysis showed absorption bands at $2.7\mu$ (narrow) and $2.9\mu$ (wide), indicative of —OH, and broad bands at 7.7 to $9.2\mu$, indicative of C—F.

A hot benzene solution of the modified polymer prepared as above was applied to a warm steel panel (Bonderized® 1000). The coated panel was then heated on a hot plate to remove the solvent. The resulting film was clear and adhered strongly to the metal substrate. In fact, the film could not be stripped from the support. When the coated panel was placed in boiling water for three hours, the uncoated portions of the steel rusted badly but the coated part of the panel was unaffected.

A film of the modified polymer was dyed using water-soluble dyes (Du Pont Sevron® Orange and Sevron® Blue LG) and an alcohol-soluble dye (Du Pont Lithosol® Blue–60). The dyes did not bleed out of the polymer when the dyed films were placed between paper sheets and the composite subjected to a pressure of 3 kg./sq. in. for three days at room temperature. The dyed films are useful as wrapping foils.

Comparative properties of the unmodified and modified polyethylenes determined on films prepared therefrom, are as follows:

| Property | Unmodified Polyethylene Alathon® 7020 | Modified Polyethylene |
|---|---|---|
| Density, g./mil | 0.95 | 1.21 |
| Pneumatic Impact Strength, kg. cm./mil | 1.5 | 2.3 |
| Tensile Strength at Maximum, lb./sq. in. | 3,000 | 3,100 |
| Initial Tensile Modulus, lb./sq. in. | 150,000 | 39,000 |
| Elongation, percent | 900 | 385 |

The flat sides of two parallel glass slides were pressed together with some of the above modified polyethylene therebetween. When cooled, the glass plates adhered so strongly that they could be separated only by breaking the glass. Thus, the modified polymer is useful as a laminating adhesive.

Poly(methyl methacrylate) containing 20% of the modified polymer prepared as above produced films which could be creased without cracking, in contrast to unmodified poly(methyl methacrylate) which forms very brittle films. The poly(methyl methacrylate) films containing the modified polymers are useful as wrapping foils.

EXAMPLE III

A mixture of 200 ml. of benzene, 0.4 g. of di-t-butyl peroxide, 15 g. of isotactic polypropylene, and 30 g. of hexafluoroacetone was heated to 135° C. under autogenous pressure with agitation for 12 hours. The resulting modified elastomeric polymer weighed 15 g. and when dried at 100° C., under vacuum, analyzed 4.69% F, which corresponds to a hexafluoroacetone content of 6.8%.

EXAMPLE IV

A mixture of 100 ml. of benzene, 20 g. of an 80% methyl methacrylate, 20% ethyl acrylate copolymer, 0.3 g. of di-t-butyl peroxide, and 17 g. of hexafluoroacetone was heated at 135° C. for eight hours under autogenous pressure. The resulting solid polymer (18 g.) analyzed 3.57% F, which corresponds to a hexafluoroacetone content of 5.2%.

EXAMPLE V

A mixture of 30 g. of a silicone polymer sold by Dow Corning as Fluid 200, 100 ml. of benzene, 0.5 g. of di-t-butyl peroxide, and 17 g. of hexafluoroacetone was heated at 135° C. for eight hours under autogenous pressure. The modified product obtained was dried under vacuum at 100° C. to give 33 g. of cloudy oil which analyzed 4.88% F. This figure corresponds to 7.1% hexafluoroacetone.

EXAMPLE VI

A 1-mil film of polyethylene (0.1037 g.) was rinsed with benzene and dried under vacuum. It was placed in a glass tube with 12 ml. of 1,3-dichloro-1,1,3,3-tetrafluoroacetone ($ClCF_2COCF_2Cl$) and irradiated with electrons from a Van de Graaff generator. The conditions used were 2.0 mev., 250 microamperes, 10 cm. from the window of the generator, 10 watts./cm.$^2$ and 12.5 watt-sec./cm.$^2$ per pass, for a total exposure of 250 watt-sec./cm.$^2$ over a three-minute period. The container was cooled by ice. After vacuum drying, the resulting film weighed 0.1126 g. for a weight gain of 8.7%. Analysis showed the film to contain 2.45% chlorine or 6.9% of combined 1,3-dichloro-1,1,3,3-tetrafluoroacetone. The infrared spectrum had bands at $8.7\mu$ for the C—F bond and $12.1\mu$ for the C—Cl bond.

EXAMPLE VII

A 1-mil film of polyethylene (0.1093 g.) was exposed to 125 watt-sec./cm.$^2$ irradiation from a Van de Graaff generator at —78° C. under vacuum. The film was removed from the generator and exposed to hexafluoroacetone vapor at one atmosphere and 25° C. The film was vacuum dried and found to weigh 0.1105 g., a weight increase of 1.1%. The film showed strong C—F absorption in the infrared at $8.25\mu$.

EXAMPLE VIII

A mixture of 20 g. of an ethylene/vinyl acetate copolymer, sold by Du Pont under the trade name of Elvax® 250, 200 ml. of benzene, 0.4 g. of di-t-butyl peroxide, and 32 g. of hexafluoroacetone was heated at 135° C. for eight hours. On removal of the solvent, there remained 25 g. of solid polymer. A sample of polymer was dissolved in benzene, the solution filtered, and the polymer reprecipitated by addition of methanol and dried at 100° C. under vacuum. Analysis of the modified polymer showed it to contain 22.54% F, which corresponds to 32.8% of combined hexafluoroacetone. The modified polymer was more elastomeric than the basic polymer.

EXAMPLE IX

A mixture of 10 g. of an ethylene/propylene copolymer containing 78% propylene, 100 ml. of benzene, 1 g. of di-t-butyl peroxide, and 15 g. of hexafluoroacetone was heated at 135° C. for 12 hours. There resulted 10 g. of sticky elastomeric product containing 19.57% F, which corresponds to 27.5% of combined hexafluoroacetone.

EXAMPLE X

A mixture of 16 g. of ethylene/propylene copolymer containing 39% propylene, 200 ml. of benzene, 20 g. of hexafluoroacetone, and 0.2 g. of di-t-butyl peroxide was heated to 135° C. for 12 hours. The product was isolated by drying. The modified elastomeric polymer showed absorption in the infrared for O—H bands at $2.8\mu$ and $2.9\mu$ and for C—F in the $8-9\mu$ region. It contained 7.84% F, corresponding to 11.4% of combined hexafluoroacetone.

EXAMPLE XI

A solution of 5 g. of polystyrene in 100 ml. of benzene, 0.3 g. of di-t-butyl peroxide, and 15 g. of hexafluoroacetone was heated at 135° C. for 12 hours. The resulting solid modified polymer was isolated by pouring the filtered solution into methanol and drying at 100° C. under vacuum. The modified polymer obtained analyzed 0.51% fluorine, which corresponds to 0.74% of combined hexafluoroacetone.

EXAMPLE XII

A mixture of 200 ml. of benzene, 20 g. of a vinyl chloride polymer sold under the trade name of Geon® 101, 0.4 g. of di-t-butyl peroxide, and 17 g. of hexafluoroacetone was heated at 135° C. for eight hours. The resulting modified solid polymer analyzed 0.91% F, which corresponds to 1.3% of hexafluoroacetone.

EXAMPLE XIII

A solution in 45 g. of 1,1,1,3,3,3-hexafluoropropanol (s-hexafluoropropanol; $(CF_3)_2CHOH$) of 6 g. of a hydroxypivalic acid polymer having an inherent viscosity of 3.71 measured in trifluoroacetic acid at 0.5% concentration and 30° C. and prepared as described in U.S. 2,658,055 and 0.2 g. of di-t-butyl peroxide was heated with 15 g. of hexafluoroacetone at 135° C. for four hours. The resulting solution was poured into water and boiled for one hour. The solid polymer which separated was isolated by filtration and dried at 100° C. under vacuum. Analysis showed the polymer to contain 1.43% fluorine, which corresponds to 2.1% of combined hexafluoroacetone.

EXAMPLE XIV

A mixture of 10 g. of a general molding grade poly-(hexamethyleneadipamide), 100 ml. of 3H,3,3,2,2-tetrafluoro-1-propanol ($HCF_2CF_2CH_2OH$), 0.3 g. of di-t-butyl peroxide, and 25 g. of hexafluoroacetone was heated at 135° C. for four hours. The solvent was removed by vacuum evaporation and the polymer was twice boiled for one hour, 500 ml. of water being used each time, in order to remove fluoroketone bound to amide functions. The resulting polymer analyzed 1.35% fluorine, which corresponds to 2% of combined hexafluoroacetone.

EXAMPLE XV

A filtered solution of 10 g. of a fiber-forming polyethylene glycol terephthalate polymer in 60 ml. of s-hexafluoropropanol, 0.4 g. of benzoyl peroxide, and 15 g. of hexafluoroacetone was heated at 70° C. for two hours and at 80° C. for four hours. The solvent was removed by vacuum evaporation and the polymer then heated with water for one hour. After drying at 100° C. under vacuum, the modified polymer was analyzed and found to contain 3.43% F, which corresponds to 5.0% combined hexafluoroacetone.

EXAMPLE XVI

A mixture of 200 ml. of benzene, 1 g. of polyoxytetramethylene (polytetrahydrofuran), prepared as described below, 0.3 g. of di-t-butyl peroxide, and 18 g. of hexafluoroacetone was heated at 135° C. for four hours. The pale brown mixture was concentrated by heating to 100° C./0.1 mm. to give 22 g. of a viscous product; the unmodified polymer was a tough elastomer. A sample of the modified polymer was boiled with water for two hours and dried at 100° C./0.2 mm. The resulting material analyzed 29.13% F, which corresponds to 42.5% of combined hexafluoroacetone.

The polyoxytetramethylene used in the above experiment was prepared by adding to 20 ml. of tetrahydrofuran 5 ml. of $PF_5$ gas and allowing the mixture to stand in a closed reactor at room temperature for 24 hours. Thereafter the polymer was dried by heating at 70° C. under reduced pressure.

EXAMPLE XVII

A 1-mil thick film of polyethylene, 0.1576 g., and 30 ml. of 1,3-dichloro-2,2,3,3-tetrafluoroacetone was placed in a quartz tube and irradiated with ultraviolet light from a GE H85–C3 lamp for six hours at reflux. The resulting film was dried at 60° C./0.1 mm. pressure. The dried film weighed 0.1592 g. for a weight gain of 1%. The infrared spectrum of the modified film showed an absorption band at $8.7\mu$ for the C—F bonds.

EXAMPLE XVIII

A solution of 15 g. of a formaldehyde polymer, prepared as described in U.S. 2,768,994, in 70 ml. of s-hexafluoropropanol, and 17 g. of hexafluoroacetone containing 0.4 g. of benzoyl peroxide was heated at 80° C. for four hours. The solvent was removed by boiling with water for two hours and the resulting product was dried at 100° C./0.2 mm. pressure. Analysis showed the product to contain 14.62% F, which corresponds to 21.2% of combined hexafluoroacetone.

EXAMPLE XIX

A mixture of 200 ml. of benzene, 0.2 g. of di-t-butyl peroxide, 24 g. of hexafluoroacetone, and 10 g. of polyethylene treated with hexafluoroacetone as in Example II (containing 30.51% F or 44.4% combined hexafluoroacetone) was heated with agitation at 135° C. for four hours under autogenous pressure. The resulting benzene-insoluble polymer weighed 9 g. and was found to contain 40.62% F, which corresponds to 59.3% combined hexafluoroacetone.

EXAMPLE XX

A. A 1-liter Hastelloy® C reactor was flushed with oxygen-free nitrogen and then charged with 50 g. of hexafluoroacetone, 40 g. of a polymeric paraffin wax, sold commercially as Sunoco No. 4412 wax, 1 g. of di-t-butyl peroxide, and 400 ml. of benzene. The charge was heated at 145° C. with agitation for two hours. After cooling to ambient temperature, the contents of the reactor were poured into a large excess of methanol; the modified product which separated was removed by filtration and dried. The product obtained weighed 22 g. and was snow white in color and waxy in feel. It analyzed 5.02%, which corresponds to 7.3% of combined hexafluoroacetone.

B. The above example was repeated, except that the polymer used was an emulsifiable polyethylene having a molecular weight of 2500. The product obtained weighed 47 g. and analyzed 18.89% F, which corresponds to 27.5% of combined hexafluoroacetone.

EXAMPLE XXI

A mixture of 200 ml. of benzene, 9 g. of 1H,7H-dodecafluoroheptane-3-one, $H(CH_2)_4CO(CF_2)_2H$, 20 g. of linear polyethylene, and 0.3 g. of di-t-butyl peroxide was heated at 135° C. for two hours with agitation. On cooling and opening the reactor, there was obtained 20 g. of product found on analysis to contain 0.66% F. This corresponds to 0.95% of combined polyfluoroketone.

EXAMPLE XXII

A mixture of 200 ml. of benzene, 20 g. of atactic polypropylene, 0.3 g. of di-t-butyl peroxide, and 25 g. of hexafluoroacetone was heated at 135° C. for four hours with agitation. The resulting solution was drowned in methanol to precipitate the polymer product and the latter separated by filtration. When dried, the product weighed 16 g. and was a sticky solid found to contain, by analysis, 4.48% F. This corresponds to 6.5% combined hexafluoroacetone.

EXAMPLE XXIII

A mixture of 200 ml. of benzene, 0.4 g. of di-t-butyl peroxide, 30 g. of chloropentafluoroacetone, and 20 g. of linear polyethylene was heated with shaking for three hours at 135° C. On cooling and opening the reactor there was obtained, after drying, 23 g. of polymer. Infrared analysis of this polymer showed weak absorption bands corresponding to OH at 2.3µ and to C—F in the 8.3–8.7µ region. The product analyzed 6.03% F and 2.73% chlorine, which on the basis of the chlorine analysis corresponds to 14% of combined polyfluoroketone.

EXAMPLE XXIV

A solution of 3 g. of an elastomeric copolymer containing by weight 52% ethylene, 44% propylene and 4% hexadiene-1,4, prepared as in U.S. 2,933,480, 0.15 g. of di-t-butyl peroxide and 100 ml. of dry benzene was placed in a 240-ml. Hastelloy® C reactor, flushed with nitrogen, cooled in a solid carbon dioxide/acetone bath and evacuated by means of a vacuum pump. The reactor was charged with 20 g. of hexafluoroacetone and then heated at 135° C. for 5 hours under autogenous pressure with shaking. After cooling and venting, a clear, viscous solution was poured from the reactor into 500 ml. of methanol. The polymer, which precipitated from solution, was removed and dried at 40° C. in a vacuum oven. It weighed 4.7 g. This product contained 25.3% fluorine, or 36.9% of hexafluoroacetone by weight. The inherent viscosity of this product was 0.93 in toluene at 0.1% and 25° C. The inherent viscosity of the unmodified terpolymer was 0.59 in toluene at 0.1% and 25° C.

EXAMPLE XXV

A solution of 8 g. of the elastomer of Example XXIV in 160 ml. of benzene, 40 ml. of 1,1,2-trichloro-1,2,2-trifluoroethane and 0.4 g. of di-t-butyl peroxide was charged in that order into a 400-ml. stainless steel reactor. The reactor was cooled in a solid carbon dioxide/acetone bath, flushed with nitrogen, evacuated, and then charged with 30 g. of hexafluoroacetone. The charge was heated at 135° C. for 4 hours with shaking, the reactor allowed to cool, and thereafter vented. The clear solution discharged from the reactor was poured into 1 liter of methanol. The elastomer which precipitated was collected and dried at 1 mm. and ambient temperature. It weighed 10.6 g. The product contained 17.6% of fluorine or 25.5% of hexafluoroacetone by weight; inherent viscosity=2.24 in perchloroethylene at 0.1% and 25° C.

To 10 g. of the elastomer, prepared as above, on a rubber mill, there was added the following ingredients in this order: 0.1 g. of stearic acid, 0.5 g. of zinc oxide, 0.1 g. of Thionex (tetramethyl thiuram disulfide), 5 g. of Philblack O (carbon black filler), 0.4 g. of MBT (mercaptobenzothiazole), and 0.12 g. of sulfur. The mill was maintained at 40–50° C. while compounding this stock. This composition was cured at 150° C. for one hour to an elastomer having the following properties determined by standard A.S.T.M. tests.

Tensile break (p.s.i) _____ 3,200
Elongation break (percent) _____ 260
Permanent set (percent) _____ 2
Yerzley resilience (percent):
  25° C. _____ 65
  100° C. _____ 65
Bashore harness _____ 53
Compression set _____ 10

The cured elastomeric product was found to have a much lower coefficient of friction than untreated ethylene/propylene/1,4-hexadiene elastomer, compounded and cured in an identical manner. Coefficients of friction were determined by sliding flat pieces of cured rubber (carbon black filled) with a superimposed 20 g. analytical weight down inclined planes of plate glass, stainless steel and Teflon®*. An elevation of the inclined plane was determined at which the piece of elastomer with superimposed weight no longer slid freely downward. The tangent of this angle, formed by the inclined plane and the horizontal bench top, is equal to the coefficient of friction ($\mu$) of a given elastomer sample on the material forming the inclined plane. These results are listed below.

| Elastomer (cured with carbon black) | Inclined Plane | | |
|---|---|---|---|
| | Glass | Stainless Steel | Teflon® * |
| Ethylene/propylene/1,4-hexadiene elastomer | 0.69 | 0.57 | 0.47 |
| Hexafluoroacetone modified ethylene/propylene/1,4-hexadiene elastomeric product of Example XXV | 0.36 | 0.32 | 0.23 |
| Styrene/butadiene rubber | 0.82 | 0.53 | 0.39 |

*Du Pont registered trademark for tetrafluoroethylene fluorocarbon resin.

The above results illustrate that cured hexafluoroacetone modified ethylene/propylene/1,4-hexadiene elastomer has much lower coefficients of friction than cured ethylene/propylene/1,4-hexadiene elastomer, but not modified with hexafluoroacetone, and styrene/butadiene rubber. The good elastic properties and low coefficients of fraction make the product of Example XXV highly useful in applications which depend on a highly efficient wiping action, as in windshield wipers. They are also useful in the manufacture of O-rings, seals and gaskets.

EXAMPLE XXVI

A solution of 4 g. of the elastomer used in Example XXIV in 80 ml. of dry benzene, 20 ml. of 1,1,2-trichloro-1,2,2-trifluoroethane and 0.3 g. of di-t-butyl peroxide was added in that order in a 240-ml. Hastelloy® C pressure vessel. The reactor was cooled, alternately evacuated and flushed with nitrogen a few times to eliminate air, and then charged with 20 g. of hexafluoroacetone. The charge was heated at 135° C. for 4 hours with shaking, cooled and vented. A thick solution of polymer was poured from the reactor into 300 ml. of methanol. The elastomeric product, which coagulated from solution, was collected and dried at ambient temperature and 1 mm. overnight. The dried product weighted 5 g. and analyzed for 19.5% fluorine, which corresponds to 28.8% of hexafluoroacetone by weight. It had an inherent viscosity of 1.68 in toluene at 0.1% concentration and 25° C.

EXAMPLE XXVII

A solution of 6 g. of the elastomer used in Example XXIV and 0.5 g. of di-t-butyl peroxide in 120 ml. of benzene was placed in a 240-ml. Hastelloy® C reactor. The reactor was cooled, alternately flushed with nitrogen and evacuated three time, and then charged with 30 g. of hexafluoroacetone. The charge was then heated at 135° C. for 3 hours with shaking, the reactor was allowed to cool, and vented. The reaction mixture was discharged and a polymeric gel coagulated by adding 500 ml. of methanol. The product was dried at ambient temperature and 1 mm. pressure. It weighed 15.5 g. and contained 31.88% F, or 46.8% of hexafluoroacetone by weight.

EXAMPLE XXVIII

A solution of 4 g. of the elastomer used in Example XXIV in 80 ml. of benzene, 20 ml. of 1,1,2-trichloro-1,2,2-trifluoroethane, and 0.9 g. of a 25% solution of diacetyl peroxide in dimethyl phthalate was loaded in a 240-ml. Hastelloy® C reactor, cooled, flushed with nitrogen, and evacuated. Twenty grams of hexafluoroacetone was distilled into the evacuated reactor, which was cooled in a solid carbon dioxide/acetone mixture. The charge was heated at 85° C. for 5 hours with shaking, cooled, and vented. A gel polymer was removed from the reactor, coagulated in methanol, and dried at ambient temperature and 1 mm. pressure overnight. It weighed 6.2 g. and was found to contain 29.4% fluorine or 43.4% of hexafluoro-

EXAMPLE XXIX

A solution of 8 g. of the elastomer used in Example XXIV in 200 ml. of benzene, 0.4 g. of t-butyl perpivalate was loaded into a 400-ml. stainless steel reactor, cooled in a solid carbon dioxide/acetone mixture, flushed with nitrogen, and evacuated. The reactor was charged with 30 g. of hexafluoroacetone and then heated with shaking at 55–60° C. for 4 hours. After cooling and venting, the viscous solution in the reactor was drowned by pouring it into 1 liter of methanol containing 2 g. of Santowhite®[1] (a commercial phenolic inhibitor). The elastomer was collected and dried at ambient temperature and 1 mm. pressure. It weighed 9.1 g. and contained 4.5% F or 6.6% of hexafluoroacetone by weight.

EXAMPLE XXX

A. A piece of polypropylene film, 1 mil thick, 8″ wide, 2′ long (oriented, conditioned, and heat-set), was soaked in di-t-butyl peroxide at 25° C. for four days. It was then wiped dry of all peroxide, immediately placed in a pressure vessel with 33 g. of hexafluoroacetone, and heated to 135° C. for four hours. There was obtained a flexible transparent film which was 5½″ wide and 2.5 mils thick. Analysis found 1.36% F, which corresponded to 1.97% combined hexafluoroacetone.

B. Following the above procedure, films of high molecular weight polyethylene, nylon, and polyethylene glycol terephthalate were treated with hexafluoroacetone. The modified films, contained, respectively, 6.55% F, 2.31% F, and 1.53% F.

EXAMPLE XXXI

A. A piece of polyethylene film was impregnated with benzophenone (activator) by soaking the film in a benzene solution of benzophenone and then drying. The film was placed in a quartz container, around which was placed an intense source of ultraviolet light from a low-pressure mercury discharge coil. The flask was charged with gaseous hexafluoroacetone and irradiated for 30 minutes. The film was found to contain 1.73% F. After five minutes' irradiation the film contained 0.34% F.

B. The above experiment was repeated without benzophenone. At the end of 30 minutes, the polymer was found to contain 0.31% fluorine.

The modified polymers of this invention are highly effective adhesives for laminating metals to metals, as illustrated below:

A. A hexafluoroacetone-modified polyethylene was prepared by reacting polyethylene with hexafluoroacetone in benzene solution at 135° C. for 2 hours, under autogenous pressure in the presence of di-t-butyl peroxide. The modified polyethylene was applied as a melt to a 1″ x 6″ aluminum sheet 3-mils thick, coating approximately 2.5″ of the sheet, and the coated sheet was laminated to another strip of aluminum by pressing in a Carver press for 5 minutes at 200° C. under 5000 lbs. total pressure. The peel strength was determined on an Instrom tester and found to be 10.4 lbs./inch; and B. In another experiment, aluminum strips were coated with a 10% solution of a hexafluoroacetone-modified polyethylene made by treating polyethylene with hexafluoroacetone for 2 hours at 110° C. and autogenous pressure in the presence of 2% of di-t-butyl peroxide catalyst. The coated strips were formed into a laminate as previously described. The peel strength of the laminate was found to be 7 lbs./inch.

Since obvious modifications and equivalents in the invention will be evident to those skilled in the chemical arts, I propose to be bound solely by the appended claims.

The embodiments of the invention in which an exclusive property or privilege is claimed are defined as follows:

1. A polymer having a molecular weight of at least 1000, which contains aliphatic carbon-carbon unsaturation in no more than 10 percent by weight of the recurring monomeric units making up the polymer, and having pendant from aliphatic carbon the groups

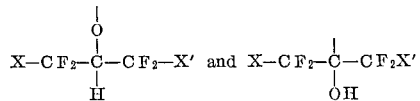

wherein X and X′ are selected from the group consisting (1), individually, of hydrogen, fluorine, chlorine and bromine, perfluoroalkyl, ω-hydro-, ω-chloro-, ω-bromo and ω-alkoxyperfluoroalkyl all of up to 18 carbons and (2), jointly, of haloperfluoroalkylene of 1–3 carbons said pendant groups contributing at least 0.5% by weight of fluorine.

2. The composition of matter of claim 1 wherein the polymer is hydrocarbon except for the pendant groups.

3. An ethylene polymer of a molecular weight of at least 1000, which contains aliphatic carbon-carbon unsaturation in no more than 10 percent by weight of the recurring monomeric unit making up the polymer, and having pendant from aliphatic carbon the groups

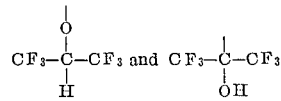

said pendant groups contributing at least 0.5% by weight of fluorine.

4. An ethylene polymer of a molecular weight of at least 1000 which contains aliphatic carbon-carbon unsaturation in no more than 10 percent by weight of the recurring monomeric units making up the polymer, and having pendant from aliphatic carbon the groups

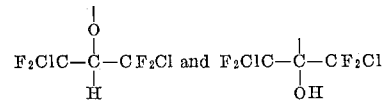

said pendant groups contributing at least 0.5% by weight of fluorine.

5. A propylene polymer of a molecular weight of at least 1000 which contains aliphatic carbon-carbon unsaturation in no more than 10 percent by weight of the recurring monomeric units making up the polymer, and having pendant from alpihatic carbon the groups

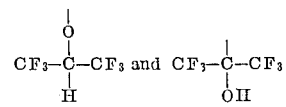

said pendant groups contributing at least 0.5% by weight of fluorine.

6. A styrene polymer of a molecular weight of at least 1000 which contains aliphatic carbon-carbon unsaturation in no more than 10 percent by weight of the recurring monomeric units making up the polymer, and having pendant from aliphatic carbon the groups

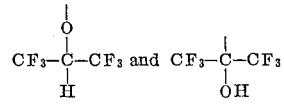

said pendant groups contributing at least 0.5% by weight of fluorine.

7. An ethylene/propylene copolymer of a molecular weight of at least 1000, which contains aliphatic carbon-carbon unsaturation in no more than 10 percent by weight

---

[1] Santowhite® powder from the Monsanto Chemical Co. has the following structure:

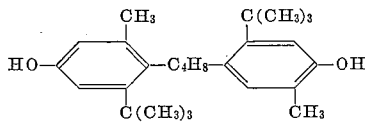

of the recurring monomeric units making up the polymer, and having pendant from aliphatic carbon the groups

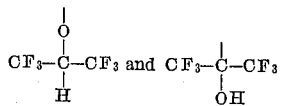

said pendant groups contributing at least 0.5% by weight of fluorine.

8. An ester polymer of a molecular weight of at least 1000, which contains aliphatic carbon-carbon unsaturation in no more than 10 percent by weight of the recurring monomeric units making up the polymer, and having pendant from aliphatic carbon the groups

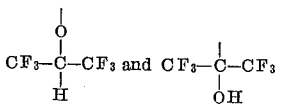

said pendant groups contributing at least 0.5% by weight of fluorine.

9. A silicone polymer of a molecular weight of at least 1000, which contains aliphatic carbon-carbon unsaturation in no more than 10 percent by weight of the recurring monomeric units making up the polymer, and having pendant from aliphatic carbon the groups

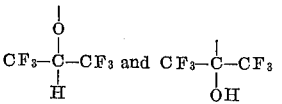

said pendant groups contributing at least 0.5% by weight of fluorine.

10. An ethylene/vinyl acetate copolymer of a molecular weight of at least 1000 which contains aliphatic carbon-carbon unsaturation in no more than 10 percent by weight of the recurring monomeric units making up the polymer, and having pendant from aliphatic carbon the groups

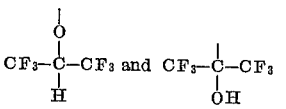

said pendant groups contributing at least 0.5% by weight of fluorine.

11. A vinyl chloride polymer of a molecular weight of at least 1000, which contains aliphatic carbon-carbon unsaturation in no more than 10 percent by weight of the recurring monomeric units making up the polymer and having pendant from aliphatic carbon the groups

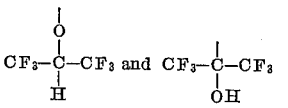

said pendant groups contributing at least 0.5% by weight of fluorine.

12. A hydroxypivalic acid polymer of a molecular weight of at least 1000, which contains aliphatic carbon-carbon unsaturation in no more than 10 percent by weight of the recurring monomeric units making up the polymer and having pendant from aliphatic carbon the groups

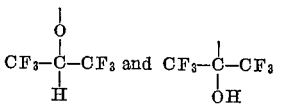

said pendant groups contributing at least 0.5% by weight of fluorine.

13. A polyamide of a molecular weight of at least 1000, which contains aliphatic carbon-carbon unsaturation in no more than 10 percent by weight of the recurring monomeric units making up the polymer and having pendant from aliphatic carbon the groups

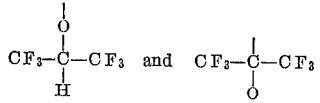

said pendant groups contributing at least 0.5% by weight of fluorine.

14. A poly(hexamethyleneadipamide) of a molecular weight of at least 1000 which contains aliphatic carbon-carbon unsaturation in no more than 10 percent by weight of the recurring monomeric units making up the polymer and having pendant from aliphatic carbon the groups

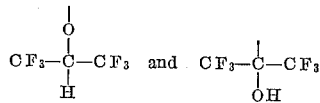

said pendant groups contributing at least 0.5% by weight of fluorine.

15. A terpolymer of ethylene, propylene and hexadiene-1,4 having a molecular weight of at least 1000 which contains aliphatic carbon-carbon unsaturation in no more than 10 percent by weight of the recurring monomeric units making up the polymers and having pendant from aliphatic carbon the groups

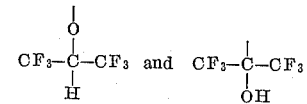

said pendant groups contributing at least 0.5% by weight of fluorine.

16. A terpolymer of claim 15 cured by reaction with a sulfur-containing curing agent.

17. The process of modifying a polymer of a molecular weight of at least 1000 which contains carbon-hydrogen bonds and not more than 10 percent by weight of aliphatic carbon-carbon unsaturation in the recurring monomeric units making up the polymer, which comprises reacting the said polymer with a ketone of the formula

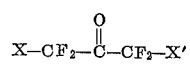

wherein X and X' are selected from the group consisting (1), individually, of hydrogen, fluorine, chlorine and bromine and perfluoroalkyl, ω-hydro-, ω-chloro-, ω-bromo- and ω-alkoxyperfluoroalkyl of up to 18 carbons and (2), jointly, of haloperfluoroalkylene of 1–3 carbons, under free radical generating conditions until at least 0.5% by weight of fluorine has been added thereto.

18. The process of claim 17 wherein the polymer is a hydrocarbon.

19. The process of claim 17 wherein the polymer is an ester.

20. The process of claim 17 wherein the polymer is a polyamide.

21. The process of claim 17 wherein the free radical generating conditions are provided by a peroxy compound.

22. The process of claim 17 wherein the free radical generating conditions are provided by radiation.

23. A film formed from a polymer of claim 1.

24. A windshield wiper formed from a terpolymer of claim 16.

No references cited.

JOSEPH L. SCHOFER, *Primary Examiner.*

LAWRENCE EDELMAN, *Assistant Examiner.*